(12) United States Patent
Colizza

(10) Patent No.: US 12,138,668 B2
(45) Date of Patent: Nov. 12, 2024

(54) DEVICE AND METHOD FOR CLEANING GRINDERS

(71) Applicant: DRM S.r.l., Casarile (IT)

(72) Inventor: Daniele Colizza, Casarile (IT)

(73) Assignee: CMA Macchine per Caffè S.r.l., Susegana (IT)

( * ) Notice: Subject to any disclaimer, the term of this patent is extended or adjusted under 35 U.S.C. 154(b) by 0 days.

(21) Appl. No.: 17/767,680

(22) PCT Filed: Oct. 15, 2020

(86) PCT No.: PCT/IB2020/059674
§ 371 (c)(1),
(2) Date: Apr. 8, 2022

(87) PCT Pub. No.: WO2021/074830
PCT Pub. Date: Apr. 22, 2021

(65) Prior Publication Data
US 2024/0116089 A1    Apr. 11, 2024

(30) Foreign Application Priority Data
Oct. 15, 2019   (IT) .................. 102019000018827

(51) Int. Cl.
| A47J 42/06 | (2006.01) |
| A47J 42/10 | (2006.01) |
| A47J 42/40 | (2006.01) |
| A47J 42/44 | (2006.01) |
| A47J 42/50 | (2006.01) |
| B08B 5/02 | (2006.01) |

(52) U.S. Cl.
CPC ............... *B08B 5/023* (2013.01); *A47J 42/06* (2013.01); *A47J 42/10* (2013.01); *A47J 42/40* (2013.01); *A47J 42/44* (2013.01); *A47J 42/50* (2013.01)

(58) Field of Classification Search
None
See application file for complete search history.

(56) References Cited

U.S. PATENT DOCUMENTS

| 5,950,941 | A  * | 9/1999 | McNeill ................. | A47J 42/40 241/245 |
| 6,595,445 | B2 * | 7/2003 | Fagan .................... | A47J 42/40 241/245 |
| 6,948,668 | B2 * | 9/2005 | Mazzer .................. | A47J 42/40 99/280 |
| 10,201,248 | B2 * | 2/2019 | Bakke .................... | A47J 42/06 |

(Continued)

FOREIGN PATENT DOCUMENTS

| DE | 102013015433 A1 * | 3/2014 | ............. A47J 31/42 |
| EP | 2934249 | 8/2018 | |

*Primary Examiner* — Thor S Campbell
(74) *Attorney, Agent, or Firm* — Themis Law

(57) ABSTRACT

A device and related method for reducing coffee beans into powder includes a primary tank or hopper for containing the coffee beans, a grinding chamber, one or more unloading ducts for unloading coffee powder from the grinding chamber, a ground coffee collecting zone, and a system for the manual or automated removal of coffee powder residues and of accumulations thickened inside the grinding chamber, on the surfaces of the members involved in the pulverization, and on channels of the coffee into the unloading ducts using gas introduced into the grinding chamber.

13 Claims, 5 Drawing Sheets

(56) References Cited

U.S. PATENT DOCUMENTS

| | | | |
|---|---|---|---|
| 10,729,284 B2* | 8/2020 | Piras | A47J 42/40 |
| 10,912,418 B2* | 2/2021 | Zernhelt | A47J 42/40 |
| 11,304,564 B2* | 4/2022 | Nicholson | A47J 42/38 |
| 12,042,083 B2* | 7/2024 | Morgan | A47J 31/60 |
| 2006/0096469 A1* | 5/2006 | Morin | A47J 31/42 |
| | | | 99/495 |
| 2006/0219102 A1* | 10/2006 | Geroult | A47J 31/3619 |
| | | | 99/495 |
| 2007/0261563 A1* | 11/2007 | Morin | A47J 31/60 |
| | | | 99/279 |
| 2009/0145302 A1* | 6/2009 | Dutertre | A47J 42/26 |
| | | | 99/289 R |
| 2018/0110369 A1* | 4/2018 | Piras | A23F 5/08 |
| 2021/0401220 A1* | 12/2021 | Schlack | A47J 31/42 |
| 2023/0017935 A1* | 1/2023 | Kuempel | A47J 42/16 |

\* cited by examiner

DEVICE AND METHOD FOR CLEANING GRINDERS

The present invention is contextualised in the field of devices for the grinding coffee beans or similar substances, devices whose purpose is to reduce the raw material into powder to be subsequently treated, for example by solution in water.

Object of the invention is in particular a coffee grinder equipped with means for the removal of unwanted deposits inside or on the surface of the members involved in the grinding process and a related method for carrying out the cleaning, i.e. the removal of unwanted deposits.

As known, coffee can be prepared either by infusion, i.e. by immersion of the raw material in a liquid, or by percolation, i.e. by passage and filtration of a liquid into a powder of ground raw material. The so-called moka coffee belongs to this typology, as well as the also known espresso coffee, which has been widespread in public shops for a long time and for a relatively shorter time for domestic use too.

During the production phase, the coffee raw material is treated starting from the fruits of the homonymous plants and, after various processes not in the scope the invention such as harvesting, treating and roasting, it is made available as grains or beans suitable to be reduced into powder through appropriate grinding treatment by means of appropriate devices like the ones object of the present invention.

For some time now, the coffee shops market has been asking for coffee grinders able to grind coffee beans closely before consumption, so as to take advantage of the complete release of aromas while preparing coffee, in particular of the so-called espresso coffee, where the percolation process allows a greater contact with boiling water and therefore a better and more complete extraction of the various components; however, coffee powder quickly loses taste and aroma, so it is advisable that coffee beans are ground only just before use and this is often done "on the fly", that is immediately before coffee preparation.

Coffee grinders of various shapes and sizes have therefore been introduced in the market, often placed side by side and/or integrated with the coffee preparation machine, scoping the above-mentioned target, i.e. the pulverization of the beans immediately before their use in the production of liquid coffee.

Many executional forms are known, and some of them can be reduced, mutatis mutandis, to devices comprising:
- a primary tank or hopper for coffee beans, equipped with an inlet opening coupled with a cover for temporary closing and equipped with an outlet opening;
- a grinding chamber that contains one or more grinders, typically motorised, equipped with an inlet opening communicating with the said hopper outlet opening and also equipped with an outlet opening through which the ground coffee powders move through;
- offloading ducts and collection tank, involved in channelling and collecting the powder coming out from the grinding chamber.

Grinding is therefore a crucial phase in which the obtained powder granulometry and homogeneity are decisive factors for the success of all subsequent operations, in order to transfer the properties of the coffee bean to the best possible way into the cup of an espresso coffee.

The powder reduction process, regardless of the characteristics of the raw material, shall also avoid interferences in the quality/consistency of the ground coffee due to external factors, such as the type of raw material and/or climatic conditions (humidity, temperature, etc.) where the grinder operates and also interferences due to internal factors such as the temperature of the grinding members and/or wear of the parts and/or the presence of accumulations of settled raw material. In this category are included, for example, the ground coffee in the form of powder thickened in the zones or interstices in contact with the powder after grinding and before being collected in the final external destination, such as a filter holder or collection tank.

In particular, the coffee powder already settled in the grinders, depending on the zones in which it is deposited, can interact both with the beans entering the grinding chamber and with the newly produced powder, actually causing alterations to the organoleptic composition of the coffee and therefore impacting on the taste of the finished product when percolated; one of the consequences detected by the applicant is the excessive heating of the material and consequent degradation of the materials with in addition a further consequence related to the heat that also propagates to the grinding members with effects on the operational life of the coffee grinder.

Another important aspect concerns the status in which the grinding chamber and the unloading ducts operate, where cleaning is important for the correct delivery of powdered coffee both to avoid obstructions of the unloading ducts and to guarantee the correct homogeneity of the ground coffee, avoiding the uncontrolled formation of powder lumps mixed with the powder itself.

These lumps, besides being anaesthetic and worsening the coffee homogeneity in the collection tank, affect the precise determination of the quantity of ground coffee coming out of the grinder, which is particularly important when the powder is directly conveyed into a filter holder for immediate percolation and the quantity must be reached with precision.

To overcome the problems described above, state of the art techniques have been introduced to improve the coffee grinders design for controlling and/or reducing the formation of attached accumulations which, when they reach a critical mass, can be detached and join the ground coffee as lumps or which, while not being able to reach a critical mass, remain in the form of powder deposits as described above.

Specific conformations of the unloading openings and ducts are present in executive forms available on the market, sometimes even flanked by additional mechanical devices to control the flow of powder coming out from the grinding chamber. It is indeed known that during the grinding process electrostatic charges occur in the ground coffee as a result of friction between the coffee beans and the grinding members and this results in coffee particles under the form of uncontrollable powders that expand in all directions rather than in the form of a flow that can be easily conveyed to the final collection point. In this sense, a well-known technique involves combining a membrane at the outlet of the grinding chamber to act as a stabilising element against the aforementioned electrostatic charges as a result of the contact that occurs between dust and said membrane.

These control methods do, however, expose additional opposing surfaces in the flow of coffee and therefore present potential additional accumulation zones that require targeted periodic cleaning actions.

Although the conformation and introduction of specially designed mechanisms is efficient in reducing the effects described above, there is still a need for cleaning and removal operations involving, periodically, the intervention of an operator and a temporary stoppage of the machine.

The applicant has observed that, despite the indications, even automated ones, which are presented to users, they do not always operate in this direction and therefore in general there is a need to further improve the cleaning process of the accumulations of powdered coffee in coffee grinders.

In the following, unless otherwise indicated and unless additional specifications, references to gas or gas mixture shall be understood as analogous and referred to aeriform substances, accumulated by the aeriform characteristics exploited in the processes and methods described below.

The invention therefore solves these limitations with a device for the reduction of coffee powder into beans or grinder comprising:
- at least one primary tank or hopper for containing coffee beans,
- at least one grinding chamber, fed by the coffee coming from said hopper by means of appropriate feeding openings, said grinding chamber equipped with active grinding surfaces or counter-grinders and hosting one or more motorized rotating bodies or grinders with which said chamber cooperates in the process of coffee bean reduction or grinding and consequent production of coffee powder,
- one or more unloading ducts to unload the powdered coffee from the grinding chamber, which are connected to the latter by at least one outlet mouth of said chamber, said ducts intended to channelling of said powder coming out of said chamber,
- a ground coffee collecting area such as for example a temporary storage tank or a container for immediate infusion with pressurised water,
- where said device includes means for the manual or automated removal of coffee powder residues and/or accumulations thickened inside said grinding chamber and/or on the surfaces of the members involved in the pulverization and/or channelling into said unloading ducts of said ground coffee.

Advantageously, the opportunity of avoiding cleaning operations on the members involved or reducing the frequency of cleaning allow optimising the device operating time, avoiding or in any case reducing the operator's involvement in maintenance operations; a second advantage derives from this, that is the minimisation of operations to be performed on internal parts of the device and therefore the lowering of the risks of parts damage—and potentially personal injuries even serious—due to maintenance operations carried out by end-users rather than skilled operators.

It is further advantageous to avoid or in any case reduce the introduction of external parts and/or detergents in the zones involved so to prevent impurities or incompatible compounds can pollute the ground powder and therefore being consumed in liquid form by the consumer.

Said mechanisms for the removal of powder accumulations include the use of gases or gas mixtures compatible with alimentary products, which flows can be suitably introduced into one or more grinding and/or channelling zones for coffee dust. In this embodiment, therefore, it is used the cleaning effect of gas blows or jets that, suitably directed in the zones of frequent accumulation, may offer contrasting forces to the deposited powder resulting in the removal or limitation of the accumulation of said powder.

Other embodiments with elements common to the latter embodiment may include the activation of said gas in simultaneous and/or sequential combination of other specific operations performed in accordance to the objectives set by the concerned invention. For example, it is possible to foreseen the run-around activation grinding elements (without introducing coffee beans into the grinding chamber) combined with the introduction of cleaning gas into one or more cleaning zones. This combination may, for example, consist of sequential and/or alternating or repeated activation in predetermined activation intervals.

Having considered the alimentary type of the application, it immediately follows that the choice of the gas used in the aforementioned cleaning must reside on products compatible with the materials involved in the grinding process, where such compatibility must regard both the health and organoleptic effects deriving from use.

Consequently, preferred embodiments provide that this gas may consist of a mixture at least in part containing carbon dioxide (also referred to below as $CO_2$) and/or other gas for food use.

Advantageously, the choice of $CO_2$-based gases makes it possible to comply with the requirements of non-toxicity and non-alteration of the properties perceived and evaluated by the sense organs, and even more advantageously, it is possible to make the material procurement process more efficient in many cases where the use of the coffee grinder is contextual with other equipment using the same gas, for example for the production of beverages.

Different embodiments can be defined according to the gas used and its availability such as, for example, the containment in liquid form of a high pressure tank or cylinder [50-200 bar depending on the gas]; in these applications it is provided a device for gas pressure reduction and possible regasification according to a predetermined pressure or according to a pressure included in a predetermined range of pressure values and gas suitably injected in said one or more grinding and/or channelling zones of coffee powders, being said range of pressure values including the interval between 1 and 10 bar and being said pressure values preferably close to 6 bar.

Combinations of one or more of the features illustrated above may originate a further embodiment of the invention including:
- at least one tank containing a gas or compressed gas mixture and possibly combined with a device for reducing said pressure;
- at least one delivery control device for controlling the delivery of said gas at reduced pressure, said device being able to be made in the form of a valve, possibly provided with an actuator for automatic operation;
- at least one feeding duct for transporting said gas or gas mixture at reduced pressure from the tank to said at least one delivery control device;
- at least one transport channel for said gas or gas mixture for the connection of the at least one delivery control device of the gas with the zones involved in the grinding process;
- at least one opening, preferably in the form of end part of a nozzle, comprised in said transport channel and such as to allow the inflow of the gas to remove the coffee powder inside the zones involved in the process of reducing coffee beans to powder This embodiment, characterised by having means for cleaning of the grinders by intermediate pressure gas coming from an external high-pressure tank, introduces control elements of said intermediate pressure gas to regulate its supply, supply that takes place by means of one or more channels for the transport of said gas into the zones involved in the grinding, being said channels equipped with appropriate inlet and outlet openings and being part of said channels provided with structure—by way of an example with a nozzle—as aimed to vary the dynamic characteristics of the gas in order to optimise the cleaning effect.

Possible variants of this embodiment provides that the delivery control device is implemented as a valve or valves, a single unit of said valve can be combined with a single transport channel or with several transport channels possibly present or in a combination of these pairings.

Other embodiments may include automated or semi-automated mechanisms managed by control signals preferably in electrical, optical or electro/optical form. One or more valves, for example, can be equipped with mechanical, pneumatic, electric or other actuators known to expert person to allow gas control without direct manual actions.

Advantageously, it is possible to realize devices according to the present invention where gas is introduced into the grinding chamber, being said gas preferably channelled as a flow substantially tangential to the inner perimeter surface of said chamber and preferably near the zone where the said grinders and counter-grinders cooperate; gas insufflation can take place, for at least part of the ducts, in the opposite direction to the tangential movement of the grinder to be more effective against the powder accumulations formed during grinding. Specific embodiments can include a plurality of tangent flows individually oriented in opposite directions that act simultaneously or sequentially according to a predetermined sequence.

Even more advantageously, the invention has the characteristic of performing the coffee powder unloading ducts cleaning, being the said ducts equipped with at least one opening, preferably in the form of the end part of a nozzle, that allows the introduction of the gas for the removal of coffee powder into these discharge ducts by means of a connecting element, which connecting element can further act as a control element for the flow of coffee powder. This feature is particularly favourable to the achievement of the invention scopes when the ducts are equipped with internal lump-reducing conformation, that forces the coffee powder along a path specifically designed to improve the flow behaviour during the unloading from the chamber.

This is particularly advantageous in solving the technical problem of cleaning the coffee grinder because it is possible to clean all the parts affected by powder accumulation, which can be cleaned by blowing cleaning gas sequentially (for example first into the chamber and then into the unloading duct) or simultaneously in relation to the different openings for the introduction of cleaning gas. This procedure can also take place in automatic or semi-automatic mode controlled by an electronic control unit.

In addition or as an alternative to the forms presented, it is possible to implement other embodiments that make cleaning operations easier by providing a control of the raw material, i.e. coffee beans, at the entrance to the grinding chamber. In particular, there are closing means for the opening connecting the hopper with the chamber, e.g. in the form of a manually or automatically actuated shut-off damper, so as to prevent the feeding of additional coffee beans in the preliminary stages until the end of the cleaning and removal operations of the thickened coffee powder.

Further advantages, also in operational and functional terms, can be obtained by pairing one or more combinations of the previous forms with automation and control devices of at least part of the members included in the coffee grinder that is the subject of the invention. An embodiment provides for the incorporation of at least one electronic control unit running of one or more processing steps as software coded algorithms, stored and executed by at least one microprocessor that sends control signals to the above mentioned actuators and/or to other actuators or motorised parts of the device.

Additional variants may include one or more interfaces for user interaction, e.g. in the form of a graphic display possibly equipped with touch sensors whose combined use can interact with the control electronics in different ways such as early or delayed process activation, calibration of control parameters also according to raw material, duration, partialisation, etc.

Further advantages to these executive forms can finally be obtained by means of sensors to detect the operating conditions and the context where the coffee grinder operates. Consider, for example, the climatic conditions such as atmospheric pressure and humidity that can affect the thickening processes of the powder, or the thermal gradient of the ground coffee or of the grinders themselves, which thermal gradient can be used to indicate the presence of thickening, particularly on the grinder members.

The invention also implements a method for the manual and automated removal of coffee powder residues and/or accumulations of thickened inside the grinding chamber and/or on the surfaces of the members involved in the pulverization and/or channelling of ground coffee during the unloading from a coffee grinder in accordance with claim 13 and following.

These and other features and advantages of the present invention will result more clearly by the following description of some embodiments illustrated in the annexed drawings where:

FIG. 1 presents the overall view of a coffee grinder according to an embodiment;

FIG. 2b shows a subset of the grinder members as shown in FIG. 1, partially visible in a section of the construction form in said figure and visible contextually to the device according to the section of FIG. 2a;

Figure 1:
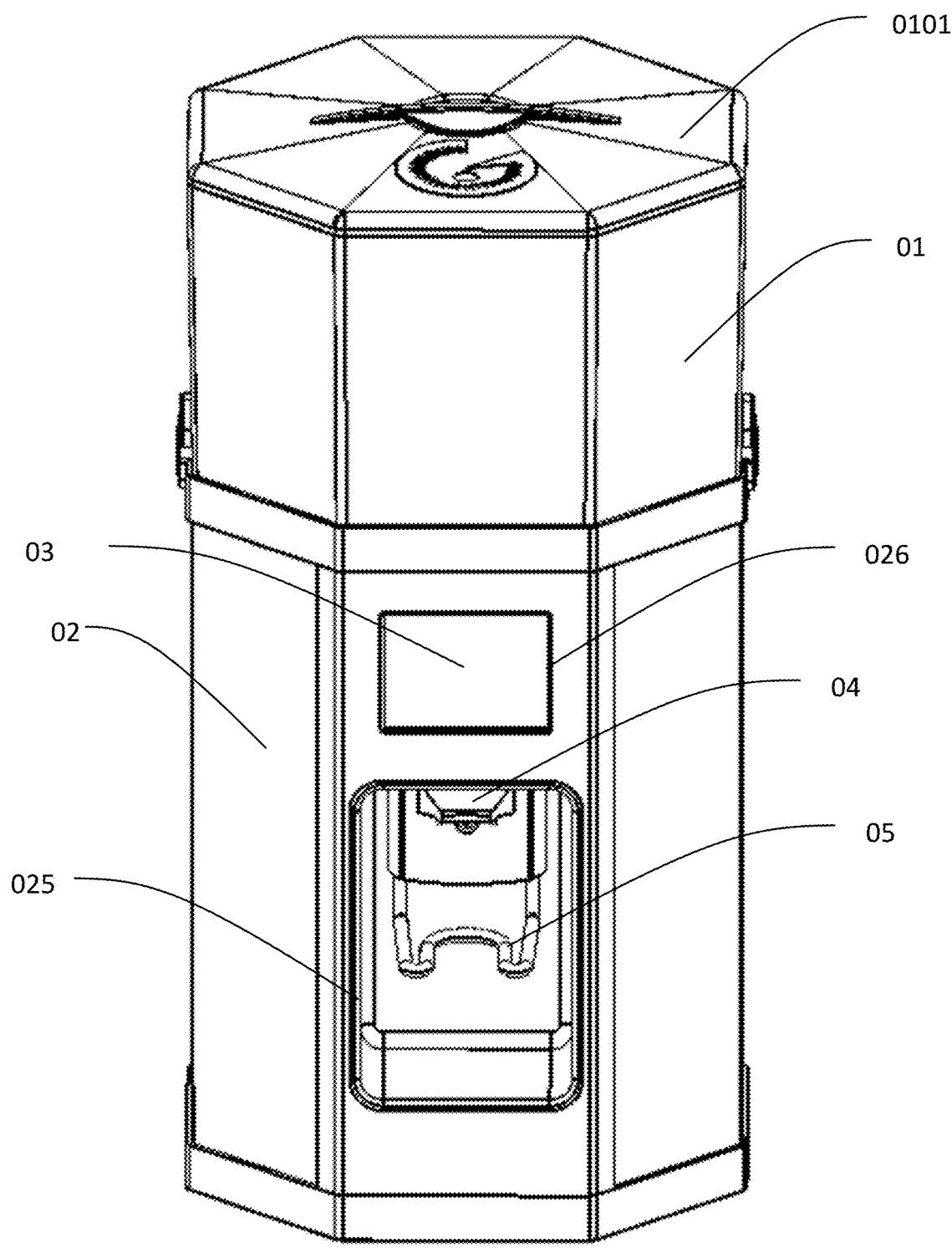

The figures listed here are therefore supporting the indicative, and therefore not limiting, description of a preferred but not exclusive embodiment of a system and method for the production of powdered coffee, of which a view is shown in FIG. 1; the concerned coffee grinding device includes a main body 02 having shape substantially similar to a regular parallelepiped with an octagonal base whose inside most of the grinding components are contained and on whose surface a certain number of openings are made to support the device operation, such as the inlet 07 of the raw material (FIG. 7), i.e. the coffee beans, inlets for any ancillary materials, for example the cleaning gas, and the finished product in powdered coffee form through an outlet opening 025.

Other openings on the said shell surface are present to contain part of the operating accessories: opening 026 allows the integration of an optical/acoustic signalling unit such as a graphic display 03 possibly equipped with touch functionality for bidirectional interaction with the operator.

Into the internal space made accessible by opening 025 are contained fork shaped parts 05 and a cylindrical hollow sector 04 to keep the ground coffee containment tank in position, containment tank which in this embodiment is implemented as a filter holder holding limited quantity of coffee, commonly one or two doses of espresso coffee, to be percolated immediately after having reached the desired quantity of coffee and possibly controlled in real time by appropriate devices (not shown) of accurate weighing.

Figures 2A, 2B:
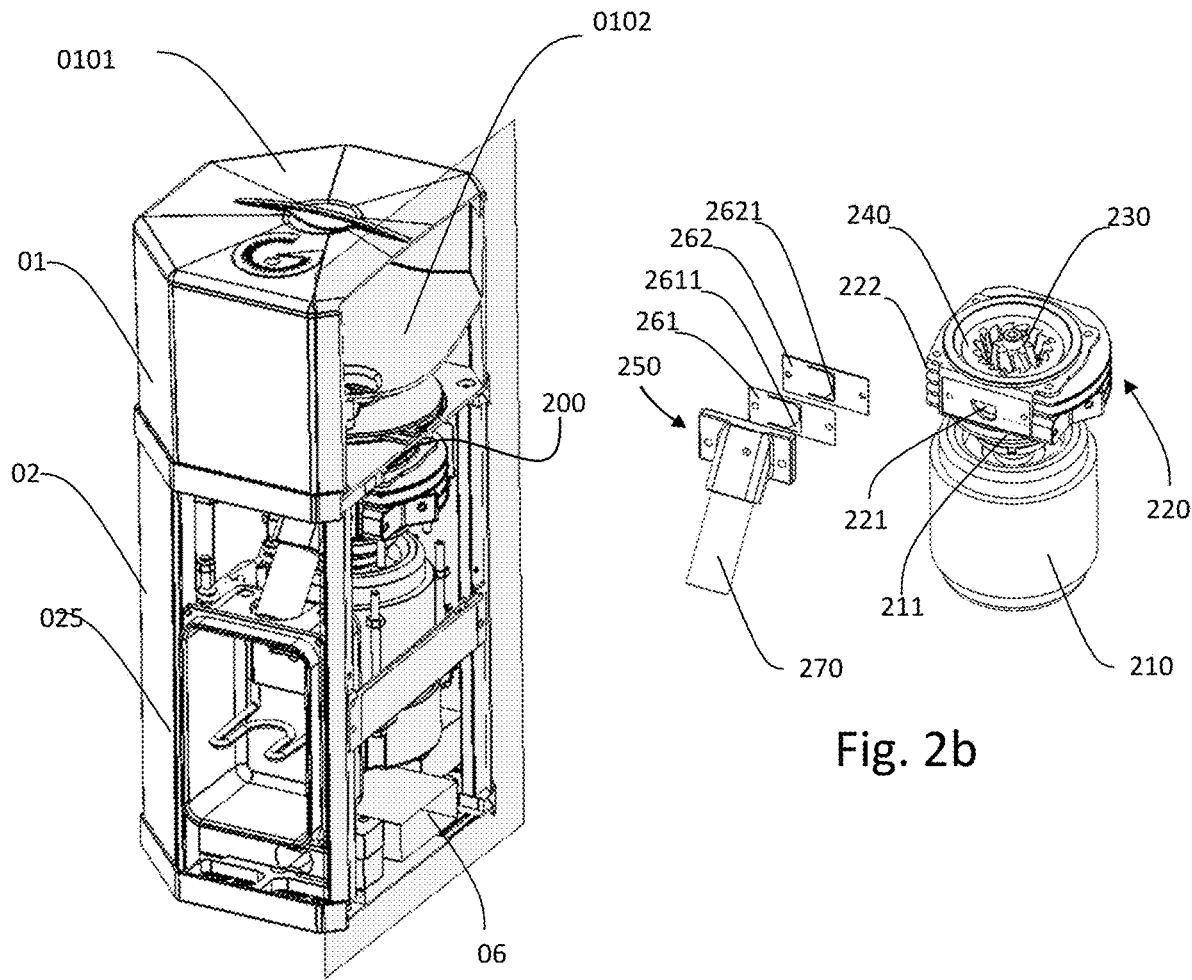

As shown also in FIG. 2a, the upper part of body 02 houses the primary tank or hopper 01, having external shape of a truncated octagonal parallelepiped forming a continuation of the main body and internally containing a hollow and substantially truncated cone structure 0102, whose cone axis is substantially parallel to the axis of the main body and oriented so as to narrow in the direction of the grinding chamber 200 near entrance 07 where the raw material, by gravity, crosses to enter the grinding chamber.

The raw material, i.e. coffee beans or grains, is fed manually into the upper part of said hopper 01, which hopper is provided with removable lid 0101 to protect the content once loaded. Grinding chamber 200, fed by the coffee coming from said hopper 01 by means of appropriate power supply openings, is composed of a hollow containment body 220 with internal cylindrical shape inside which, on the shell walls, are solidly housed grinding surfaces i.e. counter-grinds 240, said hollow containment body being able to house one or more motorised rotating members or grinders 230 axially disposed with a motor 210 responsible for driving said grinders through a lower closure or backing pad 211, said backing pad also equipped with grinding surfaces, preferably with knurling and/or grooves.

The containment body 220 is also equipped with multiple fins 222 arranged on planes orthogonal to the cylindrical axis, targeted to the dispersion of the heat generated by the members active in the grinding chamber, as well as an outlet opening 221, arranged according to a plane tangent to the internal cylindrical chamber, used for the transit of ground coffee from inside the chamber and to be conveyed towards the filter holder or more generally towards the external coffee containment tank near the cylindrical duct 270.

Two elastic foils of different materials 262 and 261, provided with U-carved notches 2621 and 2611 used to delineate a flexible tab with further bevelled edges for powder flow control, cooperate with the outlet opening 221 to disaggregate possible floating agglomerates in the coffee powder coming out from the chamber 200; in particular, notches 2621 and 2611 are characterised by different dimensions so that the cooperation of foils 262 and 261, when overlapped in contact with the outlet surface 221, generate an elastic lip able to move when stressed by the flow of air and powder to disaggregate any lumps of powder trapped in the shrinkage therewith created.

An additional connecting element 250, better described in the following figures, is interposed between the grinding chamber and the cylindrical unloading duct 270; in addition to the adjusting function between the flat surface of the outlet mouth 221 and the tubular duct 270, being said tubular duct inclined with respect to the normal axis of said outlet port, the element 250 is characterised by a particular conformation 252 (FIG. 4a) that develops longitudinally inside the said connecting element 250 along a growing section path in the direction of the ending facing the unloading ducts, presenting a plan shape similar to a sector of a circle of increasing angular width extending along the inner surface of connecting element 250. This makes connecting element 250 also a control element for the flow of powder coming out of the grinding chamber.

Many other bodies are obviously involved in the implementation of the coffee grinder machine, however those described so far are the main ones involved in the production and transit of powdered coffee which, as said, is created by crushing the beans entering the grinding chamber and coming from the primary tank. It is on these members that the means of removal/cleaning belonging to the specific executive form of the invention are concentrated, said means as illustrated with the help of the following figures.

In particular, FIGS. 3a to 3d present different views in perspective of the containment body 220 previously introduced, where the presence of two transport channels 224 and 223 (dashed line) for the alimentary gas used for the removal of the accumulations respectively inside the chamber and near the outlet mouth 221 is highlighted. These channels are made in the form of through holes, preferably with cylindrical/conical profile, in the containment body 220 for example at the same time as the manufacturing by melting or by drilling them in a subsequent processing phase.

The inlet openings of said channels, 224i and 223i as presented in section A-A', are obtained on the outer shell surface of the containment body 220 in suitable seats consisting of two flat faces 224f and 223f arranged in planes substantially parallel to the cylindrical axis of said body 220, obtained in one piece in the shell surface of body 220.

Figure 3A:
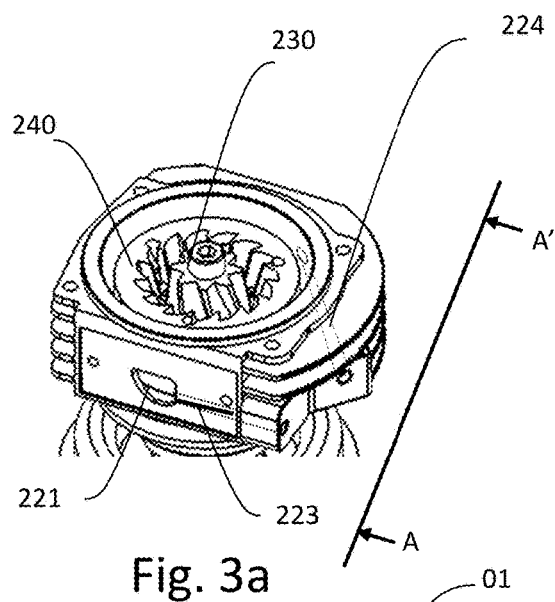
FIGS. 3a-3d show a grinding chamber body from different two and three-dimensional perspectives.
Figure 3B:
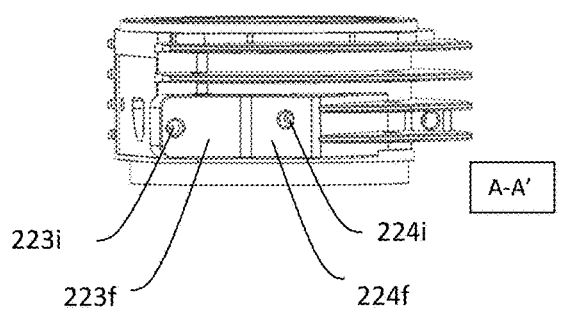
Figure 3C:
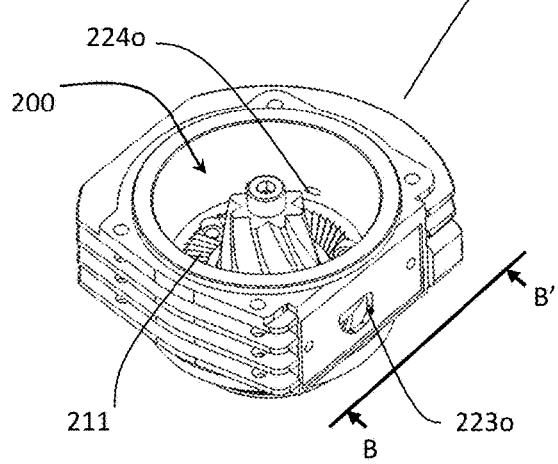
Figure 3D:
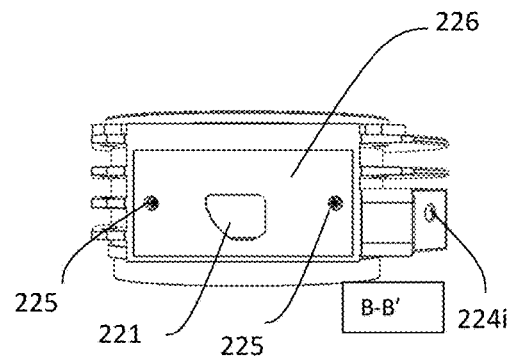

In the cleaning phase, the said inlet openings 224i and 223i are travelled by the gas or gas mixture under pressure to transport said gas or gas mixture near the coffee powder accumulation areas, which in this specific embodiment is implemented:

- via the outlet 224o, tangent to the grinding chamber and located near the lower grinding members between the backing pad 211 and the rotating grinder 230 as shown in FIG. 3c where, for reasons of clarity, the counter-grinder 240 in FIG. 3a has been removed;
- via outlet 223o, that carries the gas to the outlet 221 where the aforementioned foils 262 and 261 for the control of un-deposited agglomerations are provided.

A further cleaning point is foreseen in this embodiment in the connecting element 250 which, as said, is internally provided with specific conformation 252 for the control of the powder flow and, as for the aforesaid foils, acts by opposing more or less regular control surfaces to the travelling coffee powders with the consequent formation of powder accumulations localized in one or more zones of said surfaces or part of them.

Figure 4A:
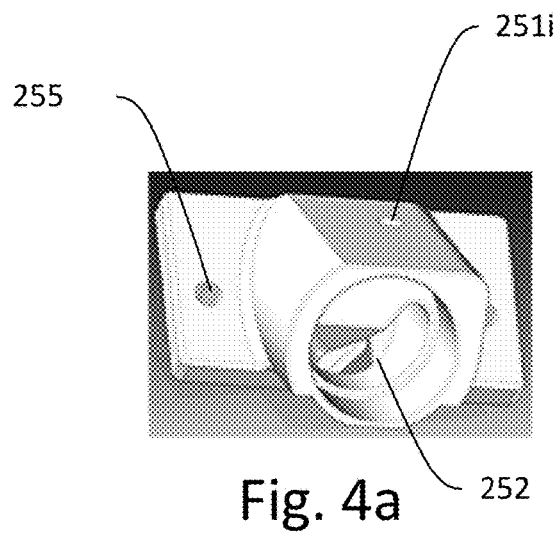
FIGS. 4a, 4b and 4c show an unloading duct organ in accordance to the embodiment of the previous figures.
Figure 4B:
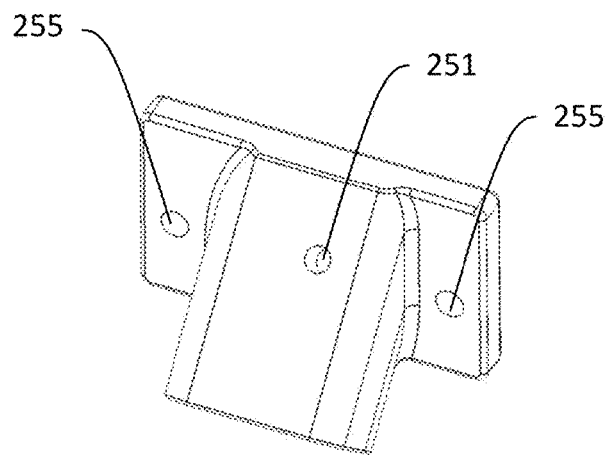
Figure 4C:
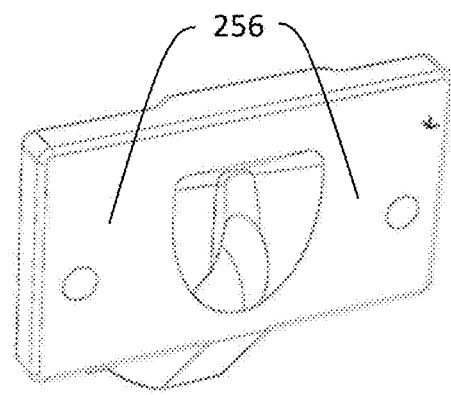
Figure 4D:
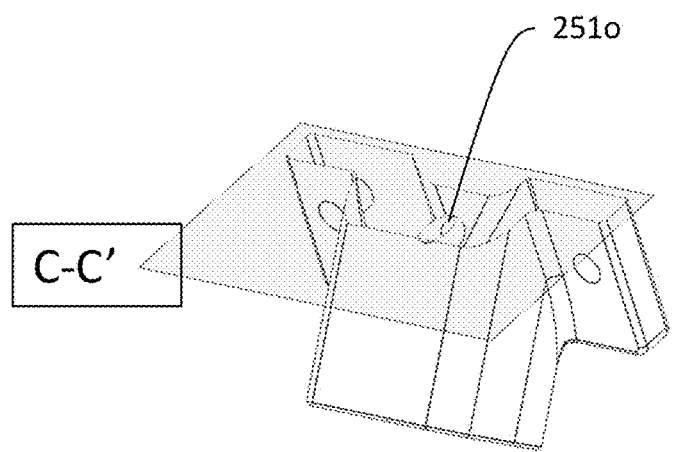
FIG. 4d shows a section of the duct in FIG. 4b with reference to the gas transit channel for the cleaning.

The invention therefore includes a channel 251 to transport pressurised gas, said gas entering through the opening 251i of FIG. 4a and exiting through the opening 251o, visible in the section C-C' of FIG. 4d, near the surface 252 which is travelled by the pressurised aeriform substance and benefits from the effect of removing thickened deposits.

As shown in FIG. 4c, connecting element 250 is provided with a flat face 256 defined to be put in contact with the corresponding flat face 226 of the containment body 220 having interposed, if present, plates 261 and/or 262 as shown in the split view of FIG. 2b. Assembly of these parts is done by fixing with appropriate means such as screws inserted in slots 255 and cooperating with threaded holes 224 in the containment body 220.

Although the invention may include a single or any combination of the three cleaning zones presented in the attached drawings and/or other zones not represented, it is particularly advantageous to use a combination, possibly sequential, of the introduction of gas pressure into the three indicated zones to enhance the desired cleaning effects.

In addition, further advantages both in terms of cleanliness and practicality of use can be obtained by means of at least one opening and closing mechanism of the feed openings of the grinding chamber, able to operate various levels of filling according to positions varying between complete freedom and complete blockage of said feed openings, being able to oppose to the transit of coffee beans from the primary tank or hopper to said grinding chamber.

Advantageously, the blockage of the bean feeding opening allows the flow of raw material into the grinding chamber to be stopped just before the insufflation of the cleaning gas without the need for the hopper to be emptied of the contents, i.e. coffee beans, emptying obtained by consumption or removal; even more advantageously, the closing of the said feeding opening facilitates the channelling of the cleaning gas, that transports the deposits already removed, in the desired direction of the unloading ducts for expulsion and eventual collection in recovery or waste tanks of the said agglomerates that have been removed from the accumulation areas.

Figure 5:
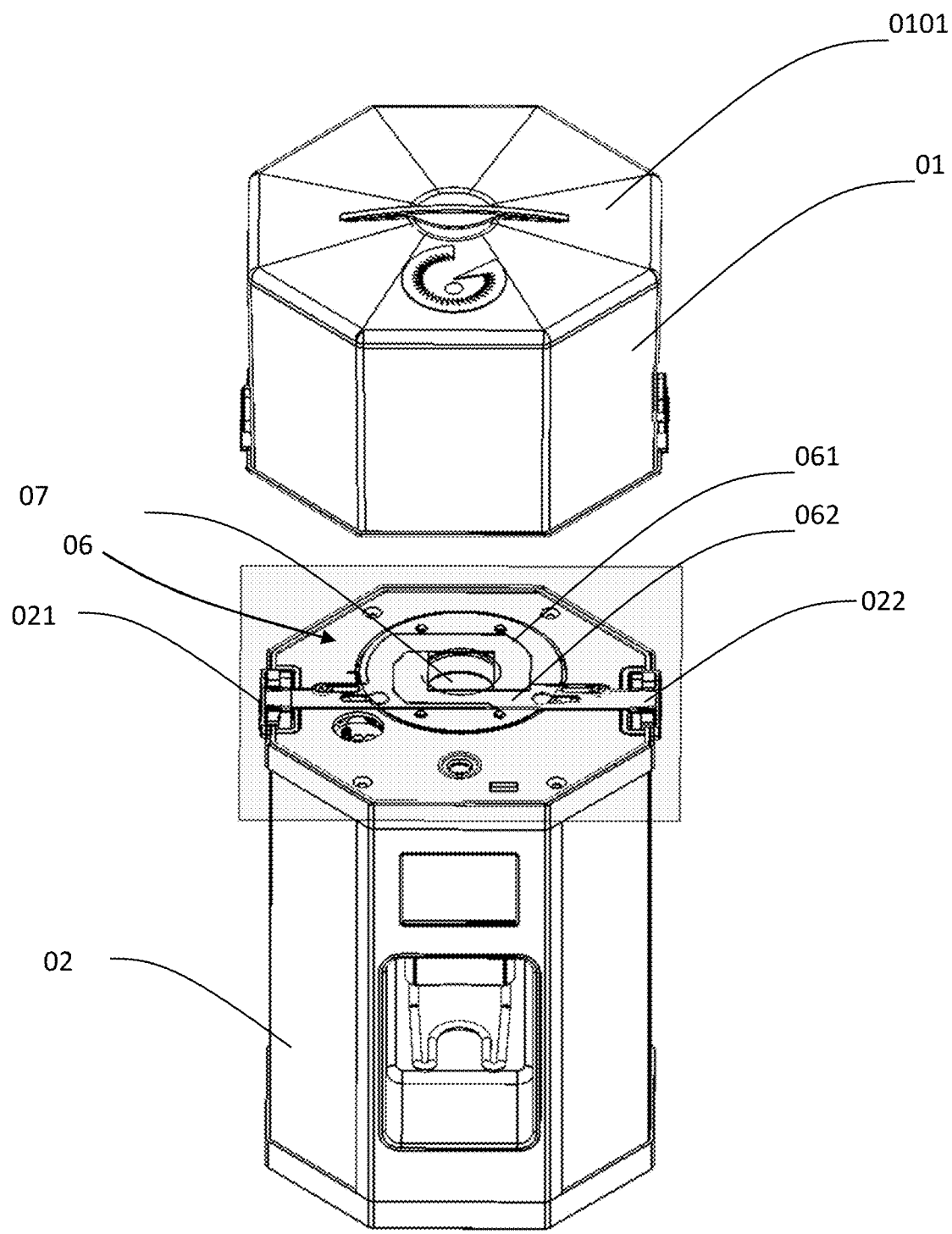
FIG. 5 shows a sectioning of the coffee grinder in FIG. 1 related to the shutter closing the hopper.

FIG. 5, showing a sectional view of the grinder in FIG. 1, shows a possible embodiment of said mechanism for opening and closing the feed openings of the grinding chamber, realized by means of a guillotine damper 06 comprising two flat-shaped elements 061 and 062 and arranged in a seat obtained according to a plane substantially orthogonal to the axis of the parallelepiped characterising the main body 02 of the coffee grinder, being said elements able to translate within the said plane when activated by transversal forces applied by acting through the openings 021 and 022, with the result of acting with partial or total blockage of the opening 07, thus reaching the purposes stated above that characterises the invention.

The said damper can be operated manually and/or automatically and/or operate within at least a predetermined sequence of steps, possibly in cooperation with other members of the coffee grinder, said members can advantageously include automated or semi-automated mechanisms managed by control signals preferably in electrical, optical or electro/optical form; one or more valves, for example, can be equipped with mechanical, pneumatic, electric or other actuator known to the skilled person such as to allow gas control without manual actions.

In these executive forms, the control signals for automatic or semi-automatic operation can be processed by a special electronic control unit 06 (FIG. 2a), dedicated to the role or shared with other processes within the coffee-grinder operation, and possibly combined with a display or touch display 03 for supervision and coordination by an operator.

From what has been described, it is clear that the device according to the invention achieves its intended purpose.

Object of the invention is subject to numerous modifications and variations, all of which fall within the inventive concept expressed in the annexed claims. All the details may be replaced by other technically equivalent elements, and the materials may be different according to requirements, without leaving the scope of protection of the present invention.

Although the object has been described with particular reference to the attached figures, the reference numbers used in the description and claims are used to improve the intelligibility of the invention and do not constitute any limitation to the scope of protection claimed.

The invention claimed is:

1. A device for reducing coffee beans to powder, comprising:
   a primary tank or hopper (01) for containing the coffee beans;
   a grinding chamber (200), having a substantially truncated-cylindrical shape, fed by the coffee beans coming from said hopper via feed openings (07), said grinding chamber being equipped with grinding surfaces integral with a main body or with counter-grinders (240), said grinding chamber housing one or more motorized rotating bodies or rotating grinders (230), which rotate around an axis substantially coaxial to a cylindrical axis of the said grinding chamber and which cooperate with said chamber during a process of reducing the coffee beans or grinding and consequent production of powdered coffee;
   one or more unloading ducts (270) to unload the powdered coffee from the grinding chamber, said one or more unloading ducts (270) being connected to the grinding chamber by a connecting element (250) with an opening proximal to an outlet mouth (221) of said grinding chamber, said one or more unloading ducts channeling said powdered coffee coming out of said grinding chamber;
   a ground coffee collecting zone,
   said device further comprising:
   means for a manual or automated removal of coffee powder residues or of accumulations thickened inside said grinding chamber or on surfaces of members involved in a grinding process using a gas or gas mixtures introduced through a duct (224o) leading into the grinding chamber and having opening (224o) to supply said gas or gas mixtures inside said grinding chamber; and
   a control member controlling a flow of said powdered coffee to prevent a formation of lumps in the powdered coffee, said control member having an opening (251) in said connecting element (250) to introduce the gas or gas mixtures for the removal of the powdered coffee inside the connecting element and inside said unloading ducts (270) and further having a second opening (223o) adjacent to said outlet mouth (221) to introduce the gas or gas mixtures adjacently to said outlet mouth (221).

2. The device according to claim 1, wherein the connecting element (250) is provided with a conformation that develops longitudinally inside the connecting element (250) along a growing section path toward the one or more unloading ducts.

3. The device according to claim 1, further comprising one or more outflow control surfaces (261, 262) placed adjacently to the outlet mouth of the grinding chamber (221) and partially obstructing the flow of the powdered coffee flowing out of said grinding chamber.

4. The device according to claim 3, wherein said one or more outflow control surfaces (261, 262) have areas of flat shape and partly overlapping the outlet mouth (221) of the grinding chamber, said control surfaces being designed to partially cover a port of the outlet mouth of said grinding chamber.

5. The device according to claim 1, wherein said rotating grinders (230) carry out dislocation movements from said counter grinders (240), also during a rotary motion of said grinders (230), so as to distance said rotating grinders from the counter grinders (240) during or in a time interval preceding the gas blowing for the removal of the coffee powder residues or of the accumulations.

6. The device according to claim 1, wherein the gas or gas mixtures at least partially contain carbon dioxide and/or another gas suitable for alimentary use, delivered at a pressure within a predetermined range of pressure values, and injected in said grinding chamber or one or more unloading ducts, said range of pressure values comprising an interval between 1 and 10 bars.

7. The device according to claim 1, further comprising:
   a tank containing the gas or the gas mixtures in compressed state;
   a valve for controlling a delivery of said gas or gas mixtures at a reduced pressure; and a feeding duct for transporting said gas or gas mixtures at the reduced pressure from the tank to said valve, said tank, valve and feeding ducts being configured to be operated manually or automatically as part of at least one predetermined sequence of steps.

8. The device according to claim 1, further comprising an opening and closing mechanism (06) of the feed openings of the grinding chamber, said opening and closing mechanism (06) being operable at various blockage levels on positions varying between complete freedom and complete blockage of said feed openings to hamper a passage of the coffee beans and of any ground coffee powder from the primary tank or hopper to the grinding chamber and vice versa, said opening and closing mechanism being operable manually or automatically as part of at least one predetermined sequence of steps.

9. The device according to claim 1, wherein said one or more unloading ducts (270) comprise at least one opening for introducing the gas or gas mixtures for the removal of the coffee powder residues inside said one or more unloading ducts.

10. The device according to claim 8, wherein an automated removing process for removing of the coffee powder residues is performed in cooperation with an electronic control unit configured to operate in a completely autonomously or partially autonomously way according to pre-set levels of interaction with an operator of the device for reducing coffee beans to powder.

11. The device according to claim 1, further comprising mechanisms for measuring or detecting a state or operating conditions of said device and/or of the coffee beans in various processing phases, said mechanisms activating and/or controlling at least part of said means for the manual and automated removal of coffee powder residues or accumulations thickened inside said grinding chamber and/or on surfaces of members involved in a pulverization and/or channeling of said powdered coffee into said one or more unloading ducts.

12. A method for a manual and automated removal of coffee powder residues and/or accumulations thickened inside a grinding chamber and/or on surfaces of members involved in a pulverization and/or channeling of ground coffee during unloading from a device according claim 8, the method comprising the following steps:

providing a device according to claim 8;

activating, manually or semi-automatically or automatically, a cycle for removing the coffee powder residues and/or accumulations;

stopping a transit of the coffee beans into the grinding chamber by closing the opening and closing mechanism to open and close of the feed openings of the grinding chamber;

activating the members for reducing the coffee beans to powder;

insufflating the gas or gas mixtures adjacently to the members involved in the reducing coffee beans to powder inside the grinding chamber and tangentially to a cylindrical inner surface of the said grinding chamber;

insufflating the gas or gas mixtures adjacently to the outlet mouth of said grinding chamber; and insufflating the gas or gas mixtures into the one or more unloading ducts to unload the powdered coffee and/or into related connecting elements.

13. The method according to claim 12, wherein the step of activating comprises causing rotary and/or axially translator movements of the rotating grinders.

* * * * *